United States Patent
Bouvier et al.

(10) Patent No.: US 10,532,342 B2
(45) Date of Patent: Jan. 14, 2020

(54) ZEOLITE ADSORBENT BASED ON MESOPOROUS ZEOLITE

(71) Applicant: Arkema France, Colombes (FR)

(72) Inventors: Ludivine Bouvier, Orthez (FR); Cècile Lutz, Gan (FR); Sylvie Szendrovics, Arthez-de-Bearn (FR)

(73) Assignee: Arkema France, Colombes (FR)

( * ) Notice: Subject to any disclaimer, the term of this patent is extended or adjusted under 35 U.S.C. 154(b) by 66 days.

(21) Appl. No.: 15/506,049

(22) PCT Filed: Nov. 5, 2015

(86) PCT No.: PCT/FR2015/052990
§ 371 (c)(1),
(2) Date: Feb. 23, 2017

(87) PCT Pub. No.: WO2016/075393
PCT Pub. Date: May 19, 2016

(65) Prior Publication Data
US 2018/0214848 A1  Aug. 2, 2018

(30) Foreign Application Priority Data
Nov. 13, 2014  (FR) ..................................... 14 60916

(51) Int. Cl.
| | | |
|---|---|---|
| *B01J 20/30* | (2006.01) | |
| *B01D 15/00* | (2006.01) | |
| *B01D 15/18* | (2006.01) | |
| *B01J 20/18* | (2006.01) | |
| *B01J 20/28* | (2006.01) | |
| *B01D 53/02* | (2006.01) | |

(52) U.S. Cl.
CPC .......... *B01J 20/3078* (2013.01); *B01D 15/00* (2013.01); *B01D 53/02* (2013.01); *B01J 20/183* (2013.01); *B01J 20/186* (2013.01); *B01J 20/2803* (2013.01); *B01J 20/28004* (2013.01); *B01J 20/28059* (2013.01); *B01J 20/28083* (2013.01); *B01J 20/305* (2013.01); *B01J 20/3028* (2013.01); *B01J 20/3042* (2013.01); *B01D 2253/1085* (2013.01); *B01D 2253/306* (2013.01); *B01D 2253/311* (2013.01)

(58) Field of Classification Search
CPC ...... B01J 20/3078; B01J 20/18; B01J 20/183; B01J 20/186; B01J 20/28004; B01J 20/2803; B01J 20/28057; B01J 20/28059; B01J 20/28083; B01J 20/3007; B01J 20/3028; B01J 20/3042; B01J 20/305; B01D 15/00; B01D 15/1821; B01D 53/02
See application file for complete search history.

(56) References Cited

U.S. PATENT DOCUMENTS

| | | | |
|---|---|---|---|
| 3,556,725 | A | 1/1971 | Chiola et al. |
| 7,785,563 | B2 | 8/2010 | Ryoo et al. |
| 2010/0196213 | A1 | 8/2010 | Lutz et al. |
| 2011/0184165 | A1* | 7/2011 | Bouvier ................... B01J 20/18 536/127 |
| 2013/0183229 | A1 | 7/2013 | Garcia-Martinez |
| 2013/0183231 | A1 | 7/2013 | Senderov et al. |
| 2015/0306565 | A1 | 10/2015 | Bouvier et al. |
| 2017/0239642 | A1* | 8/2017 | Bouvier ................. B01J 20/186 |

FOREIGN PATENT DOCUMENTS

| | | |
|---|---|---|
| EP | 2592049 A2 | 5/2013 |
| WO | 2007043731 A1 | 4/2007 |
| WO | 2008152319 A2 | 12/2008 |
| WO | 2009081023 A2 | 7/2009 |
| WO | 2013106816 A1 | 7/2013 |
| WO | 2014090771 A1 | 6/2014 |

OTHER PUBLICATIONS

Choi et al., "Amphiphilic organosilane-directed synthesis of crystalline zeolite with tunable mesoporosity", Nature Materials, vol. 5, Sep. 2006, pp. 718-723.
Inayat et al., "Assemblies of Mesoporous FAU-Type Zeolite Nanosheets", Angew. Chem. Int. Ed., 2012, vol. 51, pp. 1962-1965.
Xiao et al., "Zeolites with Hierarchically Porous Structure: Mesoporous Zeolites", Nanoscience to Catalysis, Separation, Optics, Energy, and Life Science, 1st Ed., 2012, pp. 435-455.

(Continued)

*Primary Examiner* — Melvin C. Mayes
*Assistant Examiner* — Michael Forrest
(74) *Attorney, Agent, or Firm* — RatnerPrestia

(57) ABSTRACT

The present invention relates to a zeolite adsorbent having an external surface area of between 20 $m^2 \cdot g^{-1}$ and 70 $m^2 \cdot g^{-1}$, a mesopore volume ($V_{meso}$) of less than or equal to 0.20 $cm^3 \cdot g^{-1}$, and a content of non-zeolite phase (NZP) of less than or equal to 6%, and in which at least one of its dimensions is greater than or equal to 30 μm.
The invention also relates to the process for preparing said zeolite materials in agglomerated form and to the uses thereof for gas-phase or liquid-phase separation operations.

25 Claims, No Drawings

(56) References Cited

OTHER PUBLICATIONS

Verboekend et al., "Hierarchical FAU- and LTA-Type Zeolites by Post-Synthetic Design: A New Generation of Highly Efficient Base Catalysts", Advanced Functional Materials, 2013, vol. 23, pp. 1923-1934.

Treacy et al., "Collection of Simulated XRD Powder Patterns for Zeolites", 4th Revised Edition, Elsevier, 2001, 585 pages.

Barrett et al., "The Determination of Pore Volume and Area Distributions in Porous Substances. I. Computation form Nitrogen Isotherms", J. Am. Chem. Soc. 73(1), (1951), pp. 373-380.

Wang, D. et al.: "Shape-controlled synthesis of monolithic ZSM-5 zeolite with hierarchical structure and mechanical stability", Microporous and Mesoporous Materials, Elsevier Science Publishing, New York, US, vol. 132, No. 3, Mar. 27, 2010, pp. 428-434.

D. Verboekend et al., "Hierarchical Y and USY Zeolites Designed by Post-Synthetic Strategies", Advanced Functional Materials, vol. 22 (2012), pp. 916-928.

Laurent Gueudre et al., "Superior Mass Transfer Properties of Technical Zeolite Bodies with Hierarchical Porosity", Advanced Functional Materials, vol. 24, No. 2, Jan. 1, 2014, pp. 209-219.

International Search Report and Written Opinion for International Application No. PCT/FR2015/052990, dated Mar. 8, 2016—11 Pages.

* cited by examiner

ZEOLITE ADSORBENT BASED ON MESOPOROUS ZEOLITE

CROSS-REFERENCE TO RELATED APPLICATIONS

This is the national phase of International Application No. PCT/FR2015/052990, filed 5 Nov. 2015, which claims priority to French Application No. 1460916, filed 13 Nov. 2014. The disclosure of each of these applications is incorporated herein by reference in its entirety for all purposes.

FIELD OF THE INVENTION

The present invention relates to the field of zeolite adsorbents comprising at least one mesoporous zeolite and also to the process for preparing said zeolite adsorbents.

BACKGROUND OF THE INVENTION

Inorganic mesoporous solids are well known and the synthesis thereof, in particular via a surfactant structuring effect, was described for the first time in U.S. Pat. No. 3,556,725.

These mesoporous solids (or else mesoporous zeolites, or else zeolites with a mesoporous structure) are highly useful in many industrial fields, both as catalysts and catalyst supports, but also adsorbents, in so far as their large porosity expressed in terms of [surface area/volume] ratio allows the molecules with which they come into contact to readily access the core of the particles and to react on a large surface area, thus enhancing the catalytic and/or adsorbent properties of these materials.

The company Mobil, during the 1990s, undertook extensive studies relating to mesoporous inorganic solids, in particular relating to (alumino)silicic compounds, and more particularly the compound MCM 41 (for Mobil Composition Of Matter 41), for which a synthesis process is described in *Nature*, (1992), vol. 359, pp. 710-712, and which were the subject of numerous subsequent patents and scientific articles.

Thus, these mesoporous materials are now well known on the laboratory scale, both as regards their pore structure and distribution in their modes of synthesis, and as regards the possible applications thereof as catalysts and/or as adsorbents. However, these mesoporous inorganic materials have the major drawback of being thermally unstable in the presence of water, which greatly limits the industrial applications.

The search for mesoporous inorganic solids led to the development of mesoporous zeolites obtained by various processes, as described, for example, in the article by Feng-Shou Xiao et al, (*Hierarchically Structured Porous Materials*, (2012), 435-455, Wiley-VCH Verlag GmbH & Co. KGaA: Weinheim, Germany 978-3-527-32788-1).

One of the routes envisaged is that of post-treatments of zeolite crystals, it being possible for these post-treatments to be, for example, treatments with water vapour, acidic and/or basic treatments which result in dealumination, and additional treatments to remove extra-network species, it being possible for all these post-treatments to each or together be carried out one or more times, simultaneously or consecutively.

U.S. Pat. No. 8,486,369, patent applications US 2013 0183229, US 2013 0183231, and also application WO 2013/106816 are examples which illustrate such processes for preparing zeolite with a mesoporous structure by various successive post-treatments with vapour and then with acids in the presence of surfactant.

While such processes have a tendency to create large pore volumes, as a counterpart they greatly degrade the crystallinity of the initial zeolite powder, up to close to 50% in certain cases. It is, moreover, necessary to resort to additional cauterization treatments to stabilize the zeolite framework, to remove the extra-network aluminium atoms in order to make possible the subsequent heat treatments, in particular calcination treatments, required for most of the uses of zeolite materials as catalysts or adsorbents.

Such processes which make it possible to create a certain mesoporosity within zeolite solids are therefore very laborious to implement due to the succession of numerous steps, which are sparingly economical and therefore difficult to industrialize. In addition, the multitude of steps has a tendency to embrittle the zeolite structure and, consequently, to reduce the intrinsic properties of these zeolites.

This is why syntheses of mesoporous zeolite solids directly and without post-treatment known as such in the prior art are nowadays preferred. Various publications show the feasibility of the laboratory synthesis of mesoporous zeolites, and, by way of example, applications WO 2007/043731 and EP 2 592 049 are in particular noted, in which the synthesis of mesoporous zeolites is carried out based on surfactant, and in particular that of TPOAC ([3-(trimethoxysilyl)propyl]octadecyldimethylammonium chloride) type.

Yet other publications illustrate such studies, for instance those of R. Ryoo (*Nature Materials*, 5, (2006), 718 sqq.) which describe a synthesis of LTA with mesopores, or those of A. Inayat et al. (*Angew. Chem. Int. Ed.*, (2012), 51, 1962-1965) which describe the synthesis of mesoporous FAU (X) using TPHAC ([3-(trimethoxysilyl)propyl]hexadecyldimethylammonium chloride), as structuring agent.

However, there is not at the present time any description concerning the preparation of agglomerates based on mesoporous zeolites, in which agglomerates the specific properties of these mesoporous zeolites, in particular their microporosity, are conserved. As a result, there remains at the present time no industrial application, in particular in the field of the separation of liquids and/or of gases, of ion exchange or in the field of catalysis, using such zeolite agglomerates with high microporosity comprising at least one mesoporous zeolite and the transfer kinetics of which are at least comparable to those expected owing to the presence of the mesoporosity.

There therefore remains today a need for zeolite adsorbents which have a high microporosity, i.e. a large adsorption capacity, but also which allow optimized transfers, in particular through the presence of mesopores. Thus, the current need of companies is today moving towards zeolite adsorbents which ally both an optimum adsorption capacity and optimum transfer kinetics.

It should also be recalled that the industry, and in particular the fields of application mentioned above, uses zeolite adsorbents in agglomerate form. Indeed, synthetic zeolites are usually obtained after a process of nucleation and crystallization of silicoaluminate gels in which the size of the crystallites produced is from about one micrometre to a few micrometres: they are then referred to as crystals of zeolite or zeolite in powder form.

These powders are not easy to use industrially since they are difficult to manipulate on account of their poor flowability; they generate substantial losses of pressure, and also poor distribution of the streams in the beds, in particular in dynamic processes involving fluids in flow.

Consequently, agglomerated forms of these powders are preferred, which are more commonly referred to as zeolite agglomerates or agglomerated zeolite adsorbents and which may be in the form of grains, strands, extrudates or other agglomerates, these said forms possibly being obtained by extrusion, pelletizing, atomization or other agglomeration techniques that are well known to those skilled in the art. These agglomerates do not have the abovementioned drawbacks inherent in pulverulent materials.

These agglomerates generally consist of zeolite crystals and of a binder, which is usually inert with respect to the application for which the zeolite is intended, said binder being intended to provide the cohesion of the zeolite crystals with one another and to give them the sufficient and necessary mechanical strength for the industrial application envisaged.

SUMMARY OF THE INVENTION

The objective of the present invention is thus to provide a zeolite adsorbent in agglomerated form comprising at least one mesoporous zeolite allying both adsorption capacity and mechanical strength appropriate and suitable for the application for which it is intended.

According to one preferred aspect, the objective of the present invention is also to provide a zeolite adsorbent in agglomerated form comprising at least one mesoporous zeolite allying both optimal adsorption capacity and optimal transfer kinetics, while providing a mechanical strength appropriate and suitable for the application for which it is intended.

Yet another objective consists in providing a process for preparing such a zeolite adsorbent, said process being readily industrializable, and improved in terms of cost and duration, compared with the processes for producing adsorbents that are known in the prior art, while at the same time avoiding degradation of the properties of the mesoporous zeolite(s) present in said material.

More particularly, one of the objectives of the present invention consists in providing an agglomerated zeolite adsorbent which retains within it the purity, crystallinity and pore distribution properties of the starting mesoporous zeolite(s) and moreover has good mechanical strength and optimized crystallinity and transfer kinetics, and thus enables easy, efficient and further improved industrial use, for example in the fields of catalysis (catalysts or catalyst supports), or else in dynamic or static separation, adsorption or ion-exchange processes, for liquid or gaseous fluids.

Yet other objectives will emerge in the light of the description of the present invention that follows.

The applicant has discovered that it is possible to totally or at least partially achieve the abovementioned objectives and to produce, in an economical and optimized manner, a zeolite adsorbent with a high degree of crystallinity, combining both an optimal adsorption capacity and optimal transfer kinetics. The zeolite adsorbent according to the invention has, in addition to a high level of crystallinity, a density and mechanical properties that are sufficient for use in dynamic or static adsorption processes and ion exchange processes.

Unless otherwise indicated in the present description, the proportions indicated are weight proportions, counted for the solid constituents as calcined equivalents, on the basis of calcination carried out at 950° C. for 1 hour.

Thus, and according to a first aspect, the present invention relates to a zeolite adsorbent having the following characteristics:

the external surface area, measured by nitrogen adsorption, is between 20 $m^2 \cdot g^{-1}$ and 70 $m^2 \cdot g^{-1}$, preferably between 20 $m^2 \cdot g^{-1}$ and 60 $m^2 \cdot g^{-1}$, more preferably between 30 $m^2 \cdot g^{-1}$ and 60 $m^2 \cdot g^{-1}$, even better still between 40 $m^2 \cdot g^{-1}$ and 60 $m^2 \cdot g^{-1}$, limits included, the mesopore volume ($V_{meso}$) is such that $0 < V_{meso} \leq 0.20$ $cm^3 \cdot g^{-1}$, preferably $0 < V_{meso} \leq 0.10$ $cm^3 \cdot g^{-1}$, measured by nitrogen adsorption, the content of non-zeolite phase (NZP) is such that $0 < NZP \leq 6\%$, preferably $0.5\% \leq NZP \leq 6\%$, even better still $1\% \leq NZP \leq 6\%$, more preferably $2\% \leq NZP \leq 6\%$, advantageously $3\% \leq NZP \leq 6\%$, by weight relative to the total weight of said adsorbent, and at least one of the dimensions is greater than or equal to 30 µm, preferably greater than or equal to 50 µm, more preferably greater than or equal to 80 µm, each of the measurements being carried out on the zeolite adsorbent in its sodium-exchanged form.

DETAILED DESCRIPTION OF CERTAIN EMBODIMENTS OF THE INVENTION

The external surface area of said zeolite adsorbent is measured by the t-plot method, as defined below.

According to one embodiment of the invention, the exchangeable cationic sites of the zeolite adsorbent are occupied by sodium ions, and/or by any ion known to those skilled in the art and which can come to occupy an exchangeable cationic site of a zeolite, and for example the ions of groups IA, IIA, IIIA and IIIB of the periodic table of elements, the trivalent ions of the elements of the lanthanide series, the zinc(II) ion, the copper(II) ion, the chromium(III) ion, the iron(III) ion, the ammonium ion, the hydronium ion or mixtures of two or more of them, in any proportions.

Preference is given to the ions of group IA and quite particularly sodium, potassium and lithium ions, but also the ions of group IIA, and in particular magnesium, calcium, strontium and barium ions. Among the ions of groups IIIA and IIIB, preference is given to aluminium, scandium, gallium, indium and yttrium ions, and among the trivalent ions of the elements of the lanthanide series, preference is given to lanthanum, cerium, praseodymium and neodymium ions.

According to one quite particularly preferred aspect, the exchangeable cationic sites of the zeolite adsorbent are occupied by one or more of the ions chosen from hydronium, lithium, sodium, potassium, cesium, magnesium, calcium, strontium, barium, praseodymium and lanthanum, more preferably from hydronium, lithium, sodium, potassium, cesium, calcium and barium ions, and mixtures of two or more of them in any proportions.

According to another preferred embodiment, the zeolite adsorbent of the present invention also has, in its sodium-exchanged form, a bulk density of between 0.4 $g \cdot cm^{-3}$ and 1.0 $g \cdot cm^{-3}$, preferably between 0.5 $g \cdot cm^{-3}$ and 0.9 $g \cdot cm^{-3}$, limits included. The bulk density is measured as described in standard DIN 8948/7.6.

In the present invention, the expression "zeolite adsorbent in its sodium-exchanged form" is intended to mean a zeolite adsorbent of which the cationic sites are occupied predominantly by sodium ions, i.e. the degree of sodium ion exchange is typically greater than 90%, preferably greater than 95%. The measurement of the degree of exchange is explained later in the description.

Said zeolite adsorbent in its sodium-exchanged form can be obtained and preferably is obtained according to the following protocol: the zeolite adsorbent to be exchanged with sodium is introduced into a solution of sodium chloride containing 1 mol of NaCl per litre of water, at 90° C., for 3 hours, with a liquid-to-solid ratio of 10 ml·g$^{-1}$. The operation is repeated n times, n being at least equal to 1, preferably at least equal to 2, preferably at least equal to 3, more preferably at least equal to 4.

The solids resulting from the n−1 and n exchange operations are successively washed four times by immersion in water in a proportion of 20 ml·g$^{-1}$ in order to remove the excess salt, then dried for 12 hours at 80° C. under air, before being analysed by X-ray fluorescence. If the weight percentage of sodium oxide of the zeolite adsorbent, between the n−1 and n exchange operations, is stable at ±1%, said zeolite adsorbent material is considered to be "zeolite adsorbent in its sodium-exchanged form". Where appropriate, additional exchanges are carried out as described above until a stability of the weight percentage of sodium oxide of ±1% is obtained.

It will be possible in particular to perform successive batch cationic exchanges, with a large excess of sodium chloride, until the weight content of sodium oxide of the zeolite adsorbent, determined by chemical analysis of X-ray fluorescence type, is stable at ±1%. This method of measurement is explained later in the description. As a variant, the zeolite adsorption may already be intrinsically in its sodium-exchanged form after the synthesis step when the latter is carried out exclusively in a sodium alkaline medium.

In the present invention, the adsorbents comprise at least one mesoporous zeolite, said mesoporous zeolite being advantageously chosen from mesoporous zeolites of LTA, EMT and FAU structure with an Si/Al atomic ratio of between 1 and 5, preferably of LTA and FAU structure with an Si/Al atomic ratio of between 1 and 1.4, limits included, and preferably from mesoporous zeolites of FAU structure of X, MSX and LSX type. The term "zeolite MSX" (Medium Silica X) is intended to mean a zeolite of FAU type with an Si/Al atomic ratio of between approximately 1.05 and approximately 1.15, limits included. The term "zeolite LSX" (Low Silica X) is intended to mean a zeolite of FAU type with an Si/Al atomic ratio equal to approximately 1.

According to one preferred embodiment, said at least one mesoporous zeolite present in the adsorbent according to the invention is in the form of crystals of which the number-average diameter, measured using a scanning electron microscope (SEM), is less than 20 μm, preferably between 0.1 μm and 20 μm, preferably between 0.1 and 10 μm, preferably between 0.5 μm and 10 μm, more preferably between 0.5 μm and 5 μm, limits included.

In the present invention, the term "mesoporous zeolite" is intended to mean a zeolite with an external surface area, defined by the t-plot method described later, of between 40 m$^2$·g$^{-1}$ and 400 m$^2$·g$^{-1}$, preferably between 40 m$^2$·g$^{-1}$ and 250 m$^2$·g$^{-1}$, more preferably between 40 m$^2$·g$^{-1}$ and 200 m$^2$·g$^{-1}$, limits included. By extension, for the purposes of the present invention, a "non-mesoporous zeolite" is a zeolite optionally having an external surface area, defined by the t-plot method described later, strictly less than 40 m$^2$·g$^{-1}$.

According to one preferred embodiment, the process according to the invention uses a zeolite adsorbent comprising mesoporous crystals of zeolite chosen from zeolites LTA, EMT and FAU, and mixtures of two or more of them in any proportions. Preferably, the process according to the invention uses a zeolite adsorbent comprising mesoporous crystals of zeolite FAU.

The crystals of the mesoporous zeolite(s) included in the zeolite adsorbent of the invention, alone or as a mixture with other crystals of non-mesoporous zeolites, are agglomerated with a zeolitizable binder and with up to 5% of additives. Said zeolitizable binder is zeolitized in such a way that the content of non-zeolite phase (NZP) in the adsorbent is such that 0<NZP≤6%, preferably 1%≤NZP≤6%, more preferably 2%≤NZP≤6%, by weight relative to the total weight of said adsorbent, as indicated above.

The zeolitizable binder used for preparing the adsorbent according to the invention comprises, and preferably consists of, a zeolitizable clay alone or as a mixture with one or more other zeolitizable or non-zeolitizable clays, preferably zeolitizable clays. The clays are preferably chosen from kaolins, kaolinites, nacrites, dickites, halloysites, attapulgites, sepiolites, montmorillonites, bentonites, illites and metakaolins, and also mixtures of two or more of them in any proportions, and preferably from zeolitizable clays comprising kaolins, kaolinites, nacrites, dickites, halloysites, illites and metakaolins, and also mixtures of two or more of them in any proportions.

In the present invention, it should be understood that the agglomeration binder undergoes at least one zeolitization step (conversion of the binder to zeolite), this zeolitization of said agglomeration binder not being total so that the adsorbent of the invention comprises an amount of non-zeolitized (i.e. non-crystalline) zeolitizable binder such that the content of non-zeolite phase (NZP) in the adsorbent is such that 0<NZP≤6%, preferably 0.5%≤NZP≤6%, even better still 1%≤NZP≤6%, more preferably 2%≤NZP≤6%, advantageously 3%≤NZP≤6%, by weight relative to the total weight of said adsorbent, as indicated above. The non-zeolitized agglomeration binder makes it possible, inter alia, to provide the cohesion of the crystals of zeolite(s) in the agglomerated zeolite adsorbent of the invention. This binder also differs from the crystals of zeolite(s) in that it does not have a zeolite crystalline structure after calcination, which is the reason why the non-zeolitized binder (or else residual binder) is often described as inert, and more specifically inert with respect to adsorption and/or ion exchange.

According to one particularly preferred aspect, the binder present in the agglomerated zeolite adsorbent of the invention consists solely of one or more clays, and preferably of a single clay, preferably a single zeolitizable clay.

The zeolite adsorbent according to the present invention may also comprise one or more other constituents, in an amount of between 0 and 5%, preferably between 0 and 1%, more preferably between 0 and 0.5%, limits included, the percentages being expressed by weight relative to the total weight of said zeolite adsorbent. This or these other constituent(s) is (are) generally the residues of the additives, and other auxiliary agents for the synthesis of said zeolite adsorbent, and in particular those that will be described later in the present description.

Examples of such other constituents comprise in particular ash of the additives after calcination, silica, and the like. In particular, among the additives optionally used during the production of the adsorbent of the process according to the invention, mention may be made of sources of silica of any type known to those skilled in the art specializing in the synthesis of zeolites, and for example colloidal silica, diatomaceous earths, perlites, fly ash, sand, or any other form of solid silica source.

It should be understood that these other constituents are generally present in the form of residues or traces and are not used to introduce any binding or cohesive nature into the agglomerate zeolite materials comprising at least one mesoporous zeolite of the invention.

The adsorbent of the present invention may be in various forms, such as those well known to those skilled in the art specializing in adsorption, and for example and in a non-limiting manner, the zeolite adsorbent of the invention may be in the form of beads, strands, exudates, but also membranes, films and the like.

The zeolite adsorbent according to the present invention has:
- a bulk crushing strength (BCS) measured according to standard ASTM 7084-04 of between 1.0 MPa and 3.5 MPa, preferably between 1.2 MPa and 3.5 MPa, more preferably between 1.5 MPa and 3.0 MPa, for a material with a mean volume diameter (D50), or a length (largest dimension when the material is not spherical), of less than 1 mm, limit excluded,
- a grain crushing strength, measured according to standards. ASTM D 4179 (2011) and ASTM D 6175 (2013), of between 1.5 daN and 30 daN, preferably of between 2 daN and 20 daN, for a material with a mean volume diameter (D50), or a length (largest dimension when the material is not spherical), of greater than or equal to 1 mm, limit included.

According to another aspect, a subject of the present invention is also a process for preparing the zeolite adsorbent described above, comprising at least the steps of mixing at least one mesoporous zeolite, optionally with one or more additives, with at least one binder, in the proportions indicated above, and shaping the agglomerated material, according to any method known to those skilled in the art, for example by extrusion, pelletizing, atomization or other agglomeration techniques well known to those skilled in the art and zeolitization of the agglomeration binder, according to techniques also well known to those skilled in the art.

According to one preferred embodiment, the process of the invention comprises at least the steps of:
a) agglomeration of crystals of at least one mesoporous zeolite with a number-average diameter of between 0.1 µm and 20 µm, preferably between 0.1 µm and 20 µm, preferably between 0.1 µm and 10 µm, more preferably between 0.5 µm and 10 µm and even more preferentially between 0.5 µm and 5 µm, with an Si/Al atomic ratio of between 1 and 1.4, limits included, and with a mesoporous external surface area, defined by the t-plot method described later, of between 40 m$^2 \cdot$g$^{-1}$ and 400 m$^2 \cdot$g$^{-1}$, preferably between 40 m$^2 \cdot$g$^{-1}$ and 250 m$^2 \cdot$g$^{-1}$, more preferably between 40 m$^2 \cdot$g$^{-1}$ and 200 m$^2 \cdot$g$^{-1}$, limits included, with at least one agglomeration binder, optionally one or more additives, and also with the amount of water which allows the shaping of the zeolite adsorbent;
b) drying of the agglomerates at a temperature of between 50° C. and 150° C.;
c) calcination of the agglomerates of step b), at a temperature above 150° C., for a few hours;
d) zeolitization of at least one part of the agglomeration binder by bringing the agglomerates obtained in step c) into contact with an alkaline aqueous solution, optionally in the presence of at least one structuring agent;
e) optional step of removal of the structuring agent optionally present;
f) optionally cation exchange(s) of the agglomerates of step c) or of step d) by bringing into contact with a solution of at least one alkali metal or alkaline-earth metal salt;
g) then washing and drying of the agglomerates obtained in step d) or e) under the conditions described in step b), and
h) production of the zeolite adsorbent by activation of the agglomerates obtained in step f) under the conditions described in step c).

The crystals of the at least one mesoporous zeolite that are used in step a) can be obtained according to various methods known to those skilled in the art and for example according to the syntheses described in patent application WO 2007/043731 or else by A. Inayat et al. (*Angew. Chem. Int. Ed.*, (2012), 51, 1962-1965).

It is also possible to prepare said crystals by synthesis by seeding and/or by adjustment of the synthesis operating conditions, such as the SiO$_2$/Al$_2$O$_3$ ratio, the sodium content and the alkalinity of the synthesis mixture or else according to processes for post-treatment of zeolite crystals which are conventional and known to those skilled in the art.

The post-treatment processes generally consist in removing atoms from the already formed zeolite network, either by means of one or more acid treatments which bring about dealumination of the solid, said treatment(s) being followed by one or more wash(es) with sodium hydroxide (NaOH) in order to remove the aluminium-based residues formed, as described for example by D. Verboekend et al. (*Adv. Funct. Mater.*, 22, (2012), pp. 916-928), or alternatively by treatments which combine the action of an acid and that of a structuring agent which improve the efficiency of the acid treatment, as described for example in application WO 2013/106816.

Processes for direct synthesis of these zeolites (i.e. synthesis processes other than post-treatment) are preferred and generally involve one or more structuring agents, also known as sacrificial templates.

The sacrificial templates that can be used may be of any type known to those skilled in the art and in particular those described in application WO 2007/043731. According to one preferred embodiment, the sacrificial template is advantageously chosen from organosilanes and more preferentially from organosilanes and more preferentially from [3-(trimethoxysilyl)propyl]-octadecyldimethylammonium chloride, [3-(trimethoxysilyl)propyl]hexadecyldimethylammonium chloride, [3-(trimethoxysilyl)propyl]dodecyldimethylammonium chloride, [3-(trimethoxysilyl)propyl]octylammonium chloride, N-[3-(trimethoxysilyl)propyl]aniline, 3-[2-(2-aminoethylamino)ethylamino]propyltrimethoxysilane, N-[3-(trimethoxysilyl)propyl]-N'-(4-vinylbenzyl)ethylenediamine, triethoxy-3-(2-imidazolin-1-yl)propylsilane, 1-[3-(trimethoxysilyl)propyl]urea, N-[3-(trimethoxysilyl)propyl]ethylenediamine, [3-(diethylamino)propyl] trimethoxysilane, (3-glycidyloxypropyl)trimethoxysilane, 3-(trimethoxysilyl)propyl methacrylate, [2-(cyclohexenyl)ethyl]triethoxysilane, dodecyltriethoxysilane, hexadecyltrimethoxysilane, (3-aminopropyl)trimethoxysilane, (3-mercaptopropyl)trimethoxysilane, (3-chloropropyl)trimethoxysilane, and mixtures of two or more of them in any proportions.

Among the sacrificial templates listed above, [3-(trimethoxysilyl)propyl]-octadecyldimethylammonium chloride, or TPOAC, is quite particularly preferred.

Use may also be made of sacrificial templates of higher molar mass, and for example PPDAs (Polymer PolyDiallyldimethylAmmonium), PVB (PolyVinyl Butyral) and other oligomeric compounds known in the field for increasing the diameter of mesopores.

According to one preferred embodiment of the process of the present invention, in step a), the agglomeration of crystals of at least one mesoporous zeolite, as described above, prepared in the presence of a sacrificial template intended to be removed, is carried out.

This removal can be carried out according to methods known to those skilled in the art, for example by calcination, and in a non-limiting manner, the calcination of the crystals of zeolite comprising the sacrificial template can be carried out under a flush of oxidizing and/or inert gas, in particular with gases such as oxygen, nitrogen, air, a dry and/or decarbonated air, an oxygen-depleted air, which is optionally dry and/or decarbonated, at one or more temperatures above 150° C., typically between 180° C. and 800° C., preferentially between 200° C. and 650° C., for a few hours, for example between 2 and 6 hours. The nature of the gases, the temperature increase ramps and the successive temperature steady stages and the durations thereof will be adapted as a function of the nature of the sacrificial template.

The additional step of removing the optional sacrificial template can be carried out at any time during the process for preparing the zeolite adsorbent of the invention. The removal of said sacrificial template can thus advantageously be carried out by calcination of the zeolite crystals before the agglomeration step a), or else concomitantly with the drying and/or the calcination of the adsorbent during steps b) and c).

However, it would not be a departure from the context of the invention if the agglomeration of step a) were to comprise the agglomeration of several mesoporous zeolites obtained according to different modes.

The amount of said at least one agglomeration binder can vary in large proportions and is advantageously between 5% and 30%, preferably between 5% and 25%, more preferably between 10% and 20%, by weight of binder relative to the total weight of zeolite(s) and of binder, expressed as anhydrous equivalent (weight corrected by the loss on ignition).

According to one quite particularly preferred embodiment, the agglomeration binder comprises at least 80% of a zeolitizable clay or of a mixture of zeolitizable clay(s), i.e. capable of being converted into a zeolite structure in one or more zeolitization step(s).

It would not be a departure from the context of the invention if the at least one mesoporous zeolite used in the agglomeration step a) had previously undergone one or more cationic exchange(s). In this case, it is possible to dispense with the ion exchange step f), although this is not preferred. The zeolitization step d) is carried out such that the NZP value, measured by XRD as indicated later, is as defined above.

The drying of the agglomerates (step b)) can be carried out according to any method known to those skilled in the art, and advantageously in a drying furnace according to methods well known from the prior art and advantageously under a flush of oxidizing and/or inert gas, in particular with gases such as oxygen, nitrogen, air, a dry and/or decarbonated air, an oxygen-deprived air, which is optionally dry and/or decarbonated, at a temperature above 50° C., typically between 50° C. and 150° C., preferentially between 60° C. and 80° C., for a few hours.

Step c) of calcination of the agglomerates is also carried out according to methods well known to those skilled in the art, and advantageously under a flush of oxidizing and/or inert gas, in particular with gases such as oxygen, nitrogen, air, a dry and/or decarbonated air, an oxygen-depleted air, which is optionally dry and/or decarbonated, at a temperature above 150° C., typically between 180° C. and 800° C., preferentially between 200° C. and 650° C., for a few hours, for example from 2 to 6 hours.

Likewise, the zeolitization step d) is a step that is now well known to those skilled in the art, which can be carried out according to any method described in the prior art, it being possible for the alkaline aqueous solution used to be an aqueous solution of lithium hydroxide, potassium hydroxide or sodium hydroxide, or else an aqueous solution of lithium, potassium or sodium salts, in particular halides, advantageously chlorides, the use of sodium hydroxide being quite particularly preferred.

As a general rule, the concentration of the alkaline zeolitization solution is between 0.5 M and 5 M. The zeolitization is preferably carried out under hot conditions, at a temperature above ambient temperature, for example between ambient temperature (approximately 20° C.) and the boiling point of the alkaline zeolitization solution, and for example at temperatures of about from 80° C. to 100° C. The duration of the zeolitization process is generally between a few tens of minutes and a few hours, usually between approximately 1 hour and 8 hours.

According to one embodiment of the process of the present invention, the step d) of zeolitization of at least one part of the agglomeration binder can be carried out in the presence of at least one structuring agent or sacrificial template intended to be removed according to methods known to those skilled in the art, for example by calcination, the objective of the presence of the structuring agent being to create a certain mesoporosity in the agglomerate of the invention and, thus obtain a mesoporous zeolite agglomerate.

The amount of structuring agent can vary in large proportions according to the desired degree of mesoporosity, and is advantageously between 0.1% and 50%, preferably between 0.1% and 33%, more preferably between 1% and 30%, advantageously between 5% and 30%, by weight relative to the weight of clay(s).

The nature of the structuring agent or sacrificial template may be of any type known to those skilled in the art, this being as described above for the synthesis of mesoporous zeolite.

The optional step e) of removal of the structuring agent optionally introduced during the zeolitization step d) aiming to convert a part of the agglomeration binder into mesoporous and/or optionally non-mesoporous zeolite, can be carried out by any means known to those skilled in the art and in particular by heat treatment, generally at a temperature above 150° C., typically between 180° C. and 650° C., preferentially between 200° C. and 600° C. In this case, the activation step h) carried out at high temperature also allows the removal of the structuring agent thus advantageously making it possible not to carry out the step e) of removal of said structuring agent that will in fact be removed during the activation in step h).

The activation step h) is a step that is necessary in order to release both the microporosity (removal of water) and the mesoporosity (removal of the structuring agent), if it was not removed during the optional step e)). This activation step can be carried out according to any calcination method known to those skilled in the art and for example, in a non-limiting manner and as described for step c), under a flush of oxidizing and/or inert gas, in particular with gases such as oxygen, nitrogen, air, a dry and/or decarbonated air, an oxygen-depleted air, which is optionally dry and/or decarbonated, at one or more temperatures above 150° C., typically between 180° C. and 650° C., preferentially between 200° C. and 600° C., for a few hours, for example between 2 and 6 hours. The nature of the gases, the temperature increase ramps and the successive temperature steady stages and the durations thereof will be adapted as a function of the nature of the sacrificial template.

The size of the mesoporous zeolite crystals used in step a) and of the crystals in the zeolite adsorbents of the invention is advantageously measured by observation with a scanning electron microscope (SEM) which also makes it possible to confirm the presence of a non-zeolite phase comprising, for example, residual binder (not converted during the zeolitization step) or any other amorphous phase in the adsorbents. In the description of the present invention, the term "number-average diameter" or else "size" is used for the zeolite crystals. The method for measuring these magnitudes is explained later in the description.

The agglomeration and shaping (step a) can be carried out according to any of the techniques known to those skilled in the art, such as extrusion, compacting, agglomeration on a granulating plate, a granulating drum, atomization and the like. The proportions of agglomeration binder and of zeolites used are typically those of the prior art, i.e. between 5 parts and 30 parts by weight of binder for 95 parts to 70 parts by weight of zeolite. The agglomerates resulting from step a), whether they are in the form of beads, extrudates or the like, generally have a number-average volume diameter, or a length (largest dimension when they are not spherical), of less than or equal to 7 mm, preferably of between 0.05 mm and 7 mm, even more preferably of between 0.2 mm and 5 mm and more preferentially between 0.2 mm and 2.5 mm.

During step a), in addition to the zeolite crystal(s) and the binder, one or more additives may also be added. The additives are preferentially organic, for example lignin, starch, carboxymethylcellulose, surfactant (cationic, anionic, non-ionic or amphoteric) molecules, intended to facilitate the handling of the zeolite(s)/clay(s) pulp by modification of the rheology and/or the bonding power or to give the final agglomerates satisfactory properties, in particular in terms of macroporosity. Mention may preferentially but non-exhaustively be made of methylcelluloses and derivatives thereof, lignosulfonates, polycarboxylic acids and carboxylic acid copolymers, amino derivatives thereof and salts thereof, in particular alkali metal salts and ammonium salts. The additives are introduced in a proportion of from 0 to 5%, preferably from 0.1% to 2%.

The additives also comprise a source of liquid and/or solid silica, preferably representing from 1% to 5% of the total weight of said solids. The optional source of silica may be of any type known to those skilled in the art specializing in the synthesis of zeolites, for example colloidal silica, diatomaceous earths, perlites, fly ash, sand, or any other form of solid silica.

According to one embodiment, step a) of the process of the present invention is carried out in the presence of at least one additive which is a source of silica chosen from colloidal silica, diatomaceous earths, perlites, fly ash, sand, or any other form of solid silica.

During the calcination (step c) and step h)), the nature of the gases, the temperature increase ramps and the successive temperature steady stages, and also the respective durations thereof, will be adapted as a function of the nature of the optional structuring agent to be removed and as a function of the nature of the binder and of the optional additives used in the process for synthesizing the agglomerates of the invention.

The zeolite adsorbent thus obtained has, entirely unexpectedly, optimal properties combining at the same time:
- a high degree of crystallinity, characterized by its micropore volume and consequently an optimal capacity,
- optimal transfer kinetics, characterized by its mesopore volume, and
- optimal mechanical properties for use in dynamic or static adsorption processes and ion exchange processes.

The mesoporosity of the zeolite adsorbent according to the invention can be visualized by means of mesopores that are readily identifiable for example by observation using a transmission electron microscope (TEM), as described for example in U.S. Pat. No. 7,785,563.

The agglomerated zeolite materials according to the present invention simultaneously have the characteristics of mesoporous zeolites, but also in particular the mechanical properties of the conventional zeolite agglomerates known from the prior art, i.e. in which the zeolite is non-mesoporous.

More particularly, the agglomerated zeolite materials of the invention show that it is possible to maintain the crystallinity and the mesoporosity of the zeolite within a zeolite adsorbent, and to obtain an agglomerated zeolite adsorbent which is undegraded and mechanically strong. In addition, the process for preparing the agglomerated zeolite materials with mesoporous zeolite(s) according to the invention is a process that is easy, rapid and economical to implement and thus readily industrializable with a minimum of synthesis steps.

Thus and according to yet another aspect, the present invention relates to the use of at least one zeolite adsorbent as has just been defined or capable of being obtained according to the process described above, in all the known fields where zeolites are commonly used and in particular for gas-phase or liquid-phase separation operations, and quite particularly in processes for separating gas or liquid streams, gas-phase pressure swing adsorption processes, gas- or liquid-phase temperature swing adsorption processes, fixed-bed adsorption processes without regeneration, and simulated mobile-bed separation processes.

The following examples make it possible to illustrate the subject of the invention, and are given by way of indication only, without however being in any way intended to limit the various embodiments of the present invention.

In the examples which follow, the physical properties of the agglomerates are evaluated by methods known to those skilled in the art, the principle ones of which are summarized below.

Loss on Ignition of the Zeolite Adsorbents:

The loss on ignition is determined in an oxidizing atmosphere, by calcination of the sample in air at a temperature of 950° C.±25° C., as described in standard NF EN 196-2 (April 2006). The measurement standard deviation is less than 0.1%.

Measurement of the Purity and of the Crystallinity of the Crystalline (Zeolite) Phases—Qualitative and Quantitative Analysis by X-ray Diffraction:

The purity of the zeolite phases in the adsorbents of the invention is evaluated by X-ray diffraction analysis, known to those skilled in the art under the abbreviation XRD. This identification is carried out on a Bruker XRD apparatus.

This analysis makes it possible to identify the crystalline phases present in the solid analysed, since each of the zeolite structures has a unique diffraction spectrum (or diffractogram) defined by the position of the diffraction peaks and by their relative intensities. The agglomerated zeolite adsorbents are ground and then spread out and smoothed on a sample holder by simple mechanical compression.

The conditions for the acquisition of the diffraction spectrum (or diffractogram) performed on the Bruker D5000 apparatus are as follows:
  Cu tube used at 40 kV-30 mA;
  slit size (divergent, diffusion and analysis)=0.6 mm;
  filter: Ni;
  rotating sample device: 15 rpm;
  measuring range: $3° < 2\theta < 50°$;
  increment: 0.02';

counting time per increment: 2 seconds.

The interpretation of the diffraction spectrum (or diffractogram) obtained is carried out with the EVA software with identification of the phases using the base ICCD PDF-2 release 2011.

Weight Amount of the Zeolite Fractions of the Zeolite Adsorbents

The weight amount of the zeolite fractions is measured by X-ray diffraction analysis, known to those skilled in the art under the abbreviation XRD. This analysis is carried out on a Bruker apparatus, then the amount of the zeolite fractions is evaluated from the diffractogram peak intensities, taking as reference the peak intensities of an appropriate reference (zeolite of the same chemical nature, supposedly 100% crystalline under cationic treatment conditions identical to those of the adsorbent under consideration). The peaks, which make it possible to work back to the crystallinity, are the most intense peaks of the angular zone 2θ between 9° and 37°, for example, for the zeolite FAU, the peaks observed in the angular ranges 2θ between respectively 11° and 13°, between 22° and 26° and between 31° and 33°. The most intense peaks of the angular zone 2θ are available for each family of zeolites in "Collection of Simulated XRD Powder Patterns for Zeolites", Editors: M. M. J. Treacy and J. B. Higgins, 4$^{th}$ revised edition, Elsevier, (2001).

Non-zeolite Phase (NZP) of the Zeolite Adsorbents:

The level of non-zeolite phase NZP, for example the level of residual agglomeration binder (i.e. non-zeolitized) and of any other optional amorphous phase, is calculated according to the following equation:

$$NZP=100-\Sigma(ZP),$$

where $\Sigma(ZP)$ represents the sum of the amounts of the zeolite fractions within the meaning of the invention.

Measurement of the Micropore Volume and of the Mesopore Volume:

The measurement of the micropore volume is estimated by standard methods such as measurement of the Dubinin-Raduskevitch volumes (adsorption of liquid nitrogen at 77 K or of liquid argon at 87 K).

The Dubinin-Raduskevitch volume is determined from the measurement of the isotherm of adsorption of a gas, such as nitrogen or argon, at its liquefaction temperature, as a function of the pore aperture of the zeolite structure: argon will be chosen for LTA and nitrogen will be chosen for FAU. Prior to the adsorption, the zeolite adsorbent is degassed at between 300° C. and 450° C. for a period of between 9 hours and 16 hours, under vacuum (P<6·7·10$^{-4}$ Pa). The measurement of the adsorption isotherms is then carried out on an apparatus of ASAP 2020 type from Micromeritics, taking at least 35 measurement points at P/P0 relative ratio pressures of between 0.002 and 1. The micropore volume is determined according to Dubinin-Raduskevitch from the isotherm obtained, by applying standard ISO 15901-3 (2007). The micropore volume evaluated according to the Dubinin-Raduskevitch equation is expressed in cm$^3$ of liquid adsorbate per gram of adsorbent. The measurement uncertainty is ±0.003 cm$^3$·g$^{-1}$.

The mesopore volume is determined by the Barrett-Joyner-Halenda method (BJH method, E. P. Barrett, L. G. Joyner, P. P. Halenda, "The Determination of Pore Volume and Area Distributions in Porous Substances. I. Computations form Nitrogen Isotherms", J. Am. Chem. Soc., 73(1), (1951), 373-380), from the nitrogen physisorption isotherm adsorption branch at 77K.

Measurement of the Mesopore External Surface Area (m$^2$/g) by the "t-plot" Method:

The "t-plot" calculation method exploits the data of the adsorption isotherm Q ads=f(P/P0) and makes it possible to calculate the micropore surface area. The external surface area may be deduced therefrom by determining the difference with the BET surface area which calculates the total pore surface area in m$^2$/g (BET S=micropore surface area+mesopore external surface area).

To calculate the micropore surface area by the t-plot method, the curve Q ads (cm$^3$·g$^{-1}$) is plotted as a function of t=thickness of the layer dependent on the partial pressure P/P0 which would be formed on a reference non-porous solid (t function of log (P/P0): Harkins-Jura equation applied: [13.99/(0.034-log(P/P0))^0.5]. In the interval t between 0.35 nm and 0.5 nm, a straight line may be plotted which defines a y-axis at the origin Q adsorbed which makes it possible to calculate the micropore surface area. If the solid is not microporous, the straight line passes through 0.

Measurement of the External Surface Area (m$^2$/g) of the Zeolite Adsorbent:

The external surface area of the zeolite adsorbent is measured according to the method described above using the "t-plot" calculation method by applying the Harkins-Jura equation in the interval t between 0.35 nm and 0.5 nm.

Observation of the Mesopore Structure by Transmission Electron Microscopy

After grinding the adsorbents with a mortar, the powder obtained is dispersed in ethanol for 1 minute with ultrasonication. A drop of the solution is placed on a microscope grid. The sample is left to dry under the ambient conditions.

The observation is carried out with a transmission electron microscope (CM 200 from FEI) at a voltage of 120 kV.

Particle Size of the Crystals:

The estimation of the number-average diameter of the mesoporous zeolite crystals used in step a) and of the zeolite crystals contained in the agglomerates is carried out as indicated previously by observation with a scanning electron microscope (SEM).

In order to estimate the size of the zeolite crystals on the samples, a set of images is taken at a magnification of at least 5000. The diameter of at least 200 crystals is then measured using dedicated software, for example the Smile View software from the editor LoGraMi. The accuracy is about 3%.

Bulk Crushing Strength:

The crushing strength of a bed of the zeolite adsorbents of the present invention is characterized according to the Shell method series SMS1471-74 (Shell Method Series SMS1471-74 "Determination of Bulk Crushing Strength of Catalysts. Compression-Sieve Method"), combined with the "BCS Tester" apparatus sold by the company Vinci Technologies. This method, initially intended for characterizing catalysts between 3 mm and 6 mm in size, is based on the use of a 425 μm screen which will make it possible in particular to separate the fines created during the crushing. The use of a 425 μm screen remains suitable for particles with a diameter of greater than or equal to 1 mm, but must be adapted according to the particle size of the agglomerates that it is desired to characterize.

Grain Crushing Strength:

The mechanical grain crushing strengths are determined with a Grain Crushing Strength apparatus sold by Vinci Technologies, according to standards ASTM D 4179 and D 6175.

Chemical Analysis of the Zeolite Adsorbents—Si/Al Ratio and Degree of Exchange:

An elemental chemical analysis of the final product obtained at the end of steps a) to f) described above can be carried out according to various analytical techniques known to those skilled in the art. Among these techniques, mention may be made of the X-ray fluorescence chemical analysis technique as described in standard NF EN ISO 12677: 2011 on a wavelength dispersive spectrometer (WDXRF), for example the Tiger S8 from the company Bruker. Mention may also be made of the method by ICP.

X-ray fluorescence is a non-destructive spectral technique which exploits the photoluminescence of the atoms in the X-ray range, to establish the elemental composition of a sample. Excitation of the atoms, generally with a beam of X-rays or by electron bombardment, generates specific radiations after a return to the fundamental state of the atom. The X-ray fluorescence spectrum has the advantage of depending very little on the chemical combination of the element, which offers a precise determination, both quantitatively and qualitatively. A measurement uncertainty of less than 0.4% by weight is conventionally obtained after calibration for each oxide.

Other analytical methods are for example illustrated by the atomic absorption spectrometry (AAS) and inductively coupled plasma atomic emission spectrometry (ICP-AES) methods described in standards NF EN ISO 21587-3 or NF EN ISO 21079-3 on an apparatus of for example Perkin Elmer 4300DV type.

The X-ray fluorescence spectrum has the advantage of depending very little on the chemical combination of the element, which offers a precise determination, both quantitatively and qualitatively. A measurement uncertainty of less than 0.4% by weight is conventionally obtained after calibration for each $SiO_2$ and $Al_2O_3$ oxide, and also the various oxides (such as those originating from the exchangeable cations, for example sodium). The ICP-AES method is particularly suitable for measuring the lithium content which makes it possible to calculate the lithium oxide content.

Thus, the elemental chemical analyses described above make it possible both to verify the Si/Al atomic ratio of the zeolite used within the agglomerate and the Si/Al atomic ratio of the final product obtained at the end of steps a) to h) described above, and to verify the quality of the optional cationic exchange described in step f), but also make it possible to verify the sodium content of the adsorbent in its sodium-exchanged form. In the description of the present invention, the measurement uncertainty of the Si/Al atomic ratio is ±5%.

The quality of the ion exchange is linked to the number of moles of the cation under consideration in the zeolite agglomerate after exchange. More specifically, the degree of exchange with a given cation is estimated by evaluating the ratio between the number of moles of said cation and the number of moles of all the exchangeable cations. The respective amounts of each of the cations are evaluated by chemical analysis of the corresponding cations. For example, the degree of exchange with sodium ions is estimated by evaluating the ratio between the total number of $Na^+$ cations and the total number of exchangeable cations (for example $Ca^{2+}$, $K^+$, $Li^+$, $Ba^{2+}$, $Cs^+$, $Na^+$, etc.), the amount of each of the cations being evaluated by chemical analysis of the corresponding oxides ($Na_2O$, $CaO$, $K_2O$, $BaO$, $Li_2O$, $Cs_2O$, etc.). This method of calculation also counts the possible oxides present in the residual binder of the adsorbent. However, the amount of such oxides is considered to be minor compared with the oxides originating from the cations of the exchangeable sites of the zeolite(s) of the adsorbent according to the invention.

Bulk Density

The bulk density is measured as described in standard DIN 8948/7.6.

EXAMPLE 1

Synthesis of Mesoporous Zeolite of Type X with Addition of Nucleation Gel and Growth Gel with a $TPOAC/Al_2O_3$ Ratio=0.04 a) Preparation of the Growth Gel in a Stirred Reactor with an Archimedean Screw at 300 Rpm.

A growth gel is prepared in a stainless-steel reactor equipped with a heating jacket, a temperature probe and a stirrer, by mixing an aluminate solution containing 119 g of sodium hydroxide (NaOH), 128 g of alumina trihydrate ($Al_2O_3$, $3H_2O$, containing 65.2% by weight of $Al_2O_3$) and 195.5 g of water at 25° C. for 25 minutes with a stirring speed of 300 rpm in a silicate solution containing 565.3 g of sodium silicate, 55.3 g of NaOH and 1997.5 g of water at 25° C.

The stoichiometry of the growth gel is as follows: 3.48 $Na_2O/Al_2O_3/3.07$ $SiO_2/180$ $H_2O$. The growth gel is homogenized with stirring at 300 rpm, for 25 minutes, at 25° C.

b) Addition of the Nucleation Gel 61.2 g of nucleation gel (i.e. 2% by weight) having the composition 12 $Na_2O/Al_2O_3/10$ $SiO_2/180$ $H_2O$ prepared in the same manner as the growth gel, and having matured for 1 hour at 40° C., are added to the growth gel at 25° C. with stirring at 300 rpm. After homogenization for 5 minutes at 300 rpm, the stirring speed is reduced to 100 rpm and stirring is continued for 30 minutes.

c) Introduction of the Structuring Agent into the Reaction Medium 27.3 g of a 60% solution of TPOAC in methanol (MeOH) are introduced into the reaction medium with a stirring speed of 300 rpm ($TPOAC/Al_2O_3$ mole ratio=0.04). A maturation step is carried out at 25° C. for 1 hour at 300 rpm before starting the crystallization.

d) Crystallization

The stirring speed is lowered to 50 rpm and the nominal temperature of the reactor jacket is set at 80° C. so that the temperature of the reaction medium rises to 75° C. over the course of 80 minutes. After a steady stage at 75° C. for 22 hours, the reaction medium is cooled by circulating cold water through the jacket to stop the crystallization.

e) Filtration/Washing

The solids are recovered on a sinter and then washed with deionized water to neutral pH.

f) Drying/Calcination

In order to characterize the product, drying is carried out in an oven at 90° C. for 8 hours; the loss on ignition of the dried product is 23% by weight.

The calcination of the dried product necessary to release both the microporosity (water) and the mesoporosity by removing the structuring agent is carried out with the following temperature profile: 30 minutes of temperature increase to 200° C., then 1 hour at a steady stage of 200° C., then 3 hours of temperature increase to 550° C., and 1.5 hours of steady stage at 550° C.

255 g of anhydrous equivalent solid of zeolite XPH are thus obtained; which represents a yield of 99 mol % relative to the amount of aluminium engaged. The Si/Al ratio of the mesoporous zeolite X (XPH) determined by X-ray fluorescence is equal to 1.24. The characteristics of this XPH prepared in this example 1 are collated in Table 1 below:

TABLE 1

| | Characteristics | XPH (Example 1) |
|---|---|---|
| Synthesis | TPOAC/Al$_2$O$_3$ mole ratio | 0.04 |
| | Synthesis time (h) | 24 |
| Nitrogen adsorption isotherm at 77 K | Micropore volume according to Dubinin-Raduskevitch (cm$^3 \cdot$ g$^{-1}$) | 0.335 |
| | Mesopore external surface area (m$^2$/g) | 105 |
| | Mesopore size (nm) | 5 to 10 |
| XRD spectrum (diffractogram) | Crystalline phase | X pure |
| | Crystallinity X (%) | 100 |
| SEM | Crystal size (μm) | 1 to 3 |

The size distribution of the mesopores is calculated by the Density Functional Theory (DFT) method with the cylindrical pore model. The percentage of crystallinity is calculated by means of the TOPAS software using the base ICDD PDF-2, 2011.

EXAMPLE 2

Preparation of Mesoporous Zeolite X Agglomerates, in the Presence of Zeolitizable Binder In the text which follows, the weights given are expressed as anhydrous equivalent.

A homogeneous mixture consisting of 1600 g of mesoporous zeolite X crystals obtained in example 1, 350 g of kaolin, 130 g of colloidal silica sold under the trade name Klebosol® 30 (containing 30% by weight of SiO$_2$ and 0.5% of Na$_2$O) and also the amount of water which allows extrusion of the mixture, is prepared. The loss on ignition of the pulp before extrusion is 44%.

Extrudates 1.6 mm in diameter are formed. The extrudates are dried overnight in a ventilated oven at 80° C. They are then calcined for 2 hours at 550° C. under a flush of nitrogen, and then for 2 hours at 550° C. under a flush of dry decarbonated air.

The mechanical grain crushing strength of the mesoporous zeolite X extrudates is 2.6 daN. Their bulk density is 0.64 g·cm$^{-3}$.

The Dubinin-Raduskevitch volume measured from the nitrogen isotherm is 0.269 cm$^3$·g$^{-1}$. The content of non-zeolite phase evaluated by XRD is 20% by weight relative to the total weight of the adsorbent. The external surface area measured from the nitrogen adsorption isotherm is 110 m$^2$·g$^{-1}$ and the mesopore volume is 0.18 cm$^3$·g$^{-1}$.

EXAMPLE 3

Preparation of Zeolite Adsorbents According to the Invention

The extrudates of example 2 are subjected to a zeolitization treatment.

To this effect, 200 g of these extrudates are placed in a glass reactor equipped with a jacket regulated' at a temperature of 100° C.±1° C., and then 1.5 l of an aqueous solution of sodium hydroxide at a concentration of 1 M are added and the reaction medium is left to stir for a period of 3 hours.

The extrudates are then washed in three successive operations of washing with water, followed by emptying of the reactor. The efficiency of the washing is verified by measuring the final pH of the washing waters, which should be between 10.0 and 10.5.

The mechanical grain crushing strength of the extrudates according to the invention is 3.0 daN. Their bulk density is 0.65 g·cm$^{-3}$. The Dubinin-Raduskevitch volume measured from the nitrogen isotherm is 0.322 cm$^3$ g$^-$.

The XRD analysis does not show any phase other than the faujasite phase after zeolitization. The content of non-zeolite phase evaluated by XRD is 4% by weight relative to the total weight of the adsorbent according to the invention. The external surface area measured from the nitrogen adsorption isotherm is 50 m$^2$·g$^{-1}$ and the mesopore volume is 0.07 cm$^3$·g$^{-1}$. It is thus observed that the agglomerated zeolite material according to the invention comprising a mesoporous zeolite X has mechanical and micropore volume characteristics which are better than those obtained for non-zeolitized adsorbents (cf. comparative example 2 where the binder did not undergo zeolitization).

It is thus entirely remarkable to note that the present invention makes it possible to have agglomerated zeolite materials which simultaneously combine the properties of mesoporous zeolites, the properties associated with microporosity and the mechanical properties of the zeolite agglomerates known thus far. It is thus possible to envisage without difficulty the use of the agglomerated zeolite materials of the invention in all the industrial application fields such as catalysis, separation, adsorption, and the like.

The invention claimed is:

1. A mesoporous zeolite adsorbent having the following characteristics when the zeolite adsorbent is in its sodium-exchanged form:
    an external surface area, measured by nitrogen adsorption, of between 20 m$^2$·g$^{-1}$ and 70 m$^2$·g$^{-1}$, limits included,
    a mesopore volume ($V_{meso}$) such that 0<$V_{meso}$≤0.20 cm$^3$·g$^{-1}$, measured by nitrogen adsorption,
    a content of non-zeolite phase (NZP) such that 0≤NZP 6%, by weight relative to the total weight of the adsorbent, and
    at least one dimension which is greater than or equal to 30 μm.

2. A zeolite adsorbent according to claim 1, having exchangeable cationic sites occupied by one or more ions of groups IA, IIA, IIIA and IIIB of the periodic table of elements, trivalent ions of the elements of the lanthanide series, zinc(II) ion, copper(II) ion, chromium(III) ion, iron (III) ion, ammonium ion, hydronium ion or mixtures of two or more of them, in any proportions.

3. A zeolite adsorbent according to claim 1, having exchangeable cationic sites occupied by one or more ions selected from the group consisting of hydronium, lithium, sodium, potassium, cesium, magnesium, calcium, strontium, barium, praseodymium and lanthanum, and mixtures of two or more of them in any proportions.

4. A zeolite adsorbent according to claim 1, having, in its sodium-exchanged form, a bulk density of between 0.4 g·cm$^{-3}$ and 1.0 g·cm$^{-3}$ limits included, said bulk density being measured as described in standard DIN 8948/7.6.

5. A zeolite adsorbent according to claim 1, comprising at least one mesoporous zeolite selected from the group consisting of mesoporous zeolites of LTA, EMT and FAU structure with an Si/Al atomic ratio of between 1 and 5.

6. A zeolite adsorbent according to claim 5, in which said at least one mesoporous zeolite is in the form of crystals of which the number-average diameter, measured with a scanning electron microscope (SEM) is less than 20 μm, limits included.

7. A zeolite adsorbent according to claim 1, in which the crystals of the zeolite(s) are agglomerated with a binder comprising a zeolitizable clay alone or as a mixture with one or more other zeolitizable or non-zeolitizable clays.

8. A zeolite adsorbent according to claim 1, in which the crystals of the zeolite(s) are agglomerated with a binder comprising a clay selected from the group consisting of kaolins, kaolinites, nacrites, dickites, halloysites, attapulgites, sepiolites, montmorillonites, bentonites, illites and metakaolins, and mixtures of two or more of them in any proportions.

9. A zeolite adsorbent according to claim 1, having:
- a bulk crushing strength (BCS) measured according to standard ASTM 7084-04 of between 1.0 MPa and 3.5 MPa, for a material with a mean volume diameter (D50), or a length (largest dimension when the material is not spherical), of less than 1 mm, limit excluded,
- a grain crushing strength, measured according to standards ASTM D 4179 (2011) and ASTM D 6175 (2013), of between 1.5 daN and 30 daN, for a material with a mean volume diameter (D50), or a length (largest dimension when the material is not spherical), of greater than or equal to 1 mm, limit included.

10. A process for preparing a zeolite adsorbent according to claim 1, comprising at least the steps of:
a) agglomerating crystals of at least one mesoporous zeolite with a number-average diameter of between 0.1 pm and 20 μm, with an Si/Al atomic ratio of between 1 and 1.4, limits included, and with a mesoporous external surface area, defined by the t-plot method, of between 40 $m^2 \cdot g^{-1}$ and 400 $m^2 \cdot g^{-1}$, limits included, with at least one agglomeration binder, optionally one or more additives, and also with an amount of water which allows the shaping of the zeolite adsorbent, thereby obtaining agglomerates;
b) drying the agglomerates at a temperature of between 50° C. and 150° C.;
c) calcining the agglomerates obtained in step b), at a temperature above 150° C., for a few hours;
d) zeolitizing at least one part of the agglomeration binder by bringing the agglomerates obtained in step c) into contact with an alkaline aqueous solution, optionally in the presence of at least one structuring agent;
e) optionally, removing the structuring agent optionally present;
f) optionally cation exchange(s) of the agglomerates obtained in step c) or in step d) by bringing the agglomerates into contact with a solution of at least one alkali metal or alkaline-earth metal salt;
g) then washing and drying of the agglomerates obtained in step d) or e) under the conditions described in step b), and
h) producing the zeolite adsorbent by activating the agglomerates obtained in step f) under the conditions described in step c).

11. A process according to claim 10, wherein step d) is carried out in the presence of at least one structuring agent.

12. A process according to claim 11, wherein the structuring agent is [3-(trimethoxysilyl)propyl]octadecyldimethylammonium chloride.

13. A process according to claim 10, wherein step a) is carried out in the presence of at least one additive which comprises a source of silica.

14. A process comprising using at least one zeolite adsorbent according to claim 1, wherein the process is selected from the group consisting of gas-phase and liquid-phase separation operations.

15. A zeolite adsorbent according to claim 1, wherein the external surface area, measured by nitrogen adsorption, is between 40 $m^2 \cdot g^{-1}$ and 60 $m^2 \cdot g^{-1}$, limits included.

16. A zeolite adsorbent according to claim 1, wherein the mesopore volume ($V_{meso}$) is such that $0 < V_{meso} \leq 0.10$ $cm^3 \cdot g^{-1}$, measured by nitrogen adsorption.

17. A zeolite adsorbent according to claim 1, wherein the content of non-zeolite phase (NZP) is such that $3\% \leq NZP \leq 6\%$, by weight relative to the total weight of said adsorbent.

18. A zeolite adsorbent according to claim 1, having at least one dimension which is greater than or equal to 80 μm.

19. A zeolite adsorbent according to claim 1, having, in its sodium-exchanged form, a bulk density of between 0.5 $g \cdot cm^{-3}$ and 0.9 $g \cdot cm^{-3}$ limits included, said bulk density being measured as described in standard DIN 8948/7.6.

20. A zeolite adsorbent according to claim 1, comprising at least one mesoporous zeolite selected from the group consisting of mesoporous zeolites of FAU structure of type X, MSX and LSX.

21. A zeolite adsorbent according to claim 1, which is in its sodium-exchanged form.

22. A zeolite adsorbent according to claim 21, which has a degree of sodium ion exchange of greater than 95%.

23. A zeolite adsorbent according to claim 1, which has an external surface area as measured by the t-plot method of 40 $m^2 \cdot g^{-1}$ and 400 $m^2 \cdot g^{-1}$.

24. The process according to claim 13, wherein the source of silica comprises at least one member selected from the group consisting of colloidal silica, diatomaceous earths, perlites, fly ash, and sand.

25. A separation process comprising contacting a gas phase or a liquid phase with a zeolite adsorbent according to claim 1.

* * * * *

UNITED STATES PATENT AND TRADEMARK OFFICE
CERTIFICATE OF CORRECTION

PATENT NO. : 10,532,342 B2
APPLICATION NO. : 15/506049
DATED : January 14, 2020
INVENTOR(S) : Ludivine Bouvier, Cécile Lutz and Sylvie Szendrovics Page 1 of 1

It is certified that error appears in the above-identified patent and that said Letters Patent is hereby corrected as shown below:

Column 18 In Claim 1, Line 35, please correct the text to read --such that $0<NZP\leq6\%$-- instead of "such that $0\leq NZP\ 6\%$".

Column 19 In Claim 10, Lines 25-26, please correct the text to read --between 0.1 µm-- instead of "between 0.1 pm".

Signed and Sealed this
First Day of December, 2020

Andrei Iancu
*Director of the United States Patent and Trademark Office*